(12) United States Patent
Brown et al.

(10) Patent No.: US 7,833,439 B2
(45) Date of Patent: Nov. 16, 2010

(54) ULTRA LOW-EMISSIVITY (ULTRA LOW E) SILVER COATING

(75) Inventors: Terry J. Brown, Pittsburgh, PA (US); David M. Stotka, Washington, PA (US); William G. Picard, Pittsburgh, PA (US); George E. Sakoske, Washington, PA (US)

(73) Assignee: Ferro Corporation, Cleveland, OH (US)

( * ) Notice: Subject to any disclaimer, the term of this patent is extended or adjusted under 35 U.S.C. 154(b) by 576 days.

(21) Appl. No.: 11/781,982

(22) Filed: Jul. 24, 2007

(65) Prior Publication Data

US 2009/0029057 A1   Jan. 29, 2009

(51) Int. Cl.
   *H01B 1/22* (2006.01)
(52) U.S. Cl. .................. 252/514; 106/1.14; 106/13; 501/11; 501/21; 501/22; 501/26; 252/512
(58) Field of Classification Search ............... 252/514, 252/512; 501/11, 21, 22, 26; 106/1.14, 13
See application file for complete search history.

(56) References Cited

U.S. PATENT DOCUMENTS

| | | |
|---|---|---|
| 2,892,726 A | 6/1959 | Smith et al. |
| 3,723,142 A | 3/1973 | Kato et al. |
| 4,369,063 A | 1/1983 | McGowan, Jr. |
| 4,554,258 A * | 11/1985 | Francel .................. 501/21 |
| 5,346,651 A | 9/1994 | Oprosky et al. |
| 5,417,745 A * | 5/1995 | Oprosky et al. ............ 106/13 |
| 5,932,502 A | 8/1999 | Longobardo et al. |
| 6,228,160 B1 | 5/2001 | Hanich et al. |
| 6,238,847 B1 | 5/2001 | Axtell, III et al. |
| 6,997,018 B2 | 2/2006 | Sakoske et al. |
| 7,265,069 B2 | 9/2007 | Sakoske et al. |
| 2005/0145480 A1 | 7/2005 | Neuman et al. |
| 2005/0238861 A1 | 10/2005 | Buhay et al. |
| 2007/0009747 A1 | 1/2007 | Medwick et al. |
| 2008/0187708 A1* | 8/2008 | Decker et al. ............ 428/98 |

* cited by examiner

*Primary Examiner*—Harold Y Pyon
*Assistant Examiner*—Haidung D Nguyen
(74) *Attorney, Agent, or Firm*—Rankin, Hill & Clark LLP

(57) ABSTRACT

A silver conductive coating possessing infrared absorbing properties is disclosed. The coating is made from a blend of one or more micron size silver powders and/or flakes together with carbon black, inorganic pigment, glass frit, and powdered selenium or bismuth metal. The foregoing dry ingredients are pasted with an organic vehicle, applied to a substrate, and fired at a temperature of up to 1400° F. The coating absorbs infrared radiation beyond the decomposition of carbon black, thus allowing higher firing temperatures and hence shorter firing times.

20 Claims, 3 Drawing Sheets sample A absorption

ULTRA LOW-EMISSIVITY (ULTRA LOW E) SILVER COATING

BACKGROUND OF THE INVENTION

1. Field of Invention

This invention relates to a conductive silver coating which, when during the thermal fusing (firing) of the coating to a glass, silicon, ceramic or ceramic glass enamel substrate, provides infra-red absorption properties over an extended temperature range, thus reducing thermal stress differences from developing between the coating and aforementioned substrates, that would otherwise occur.

In particular, the present invention relates to a conductive silver coating that includes combining silver metal, lead, zinc and/or bismuth borosilicate glass frit(s), a co-ground blend of selenium and/or bismuth metal powder and lead, zinc and/or bismuth borosilicate glass frit composition or combination thereof; carbon black, black inorganic pigment, a staining compound which, when firing the coating to a glass, silicon, ceramic or ceramic glass enamel substrate, provide infra-red absorption properties over an extended temperature range, thus reducing thermal stress differences from developing between the coating and the aforementioned substrates, that would otherwise occur, especially if the firing cycle time is shortened.

2. Description of Related Art

Conventional conductive silver coatings are comprised primarily of silver metal and a glass frit. As users of such coatings push to increase product output with faster firing cycle times, insufficient sintering of the coating may occur. Additionally, insufficient sintering of the coating impedes adequate adhesion of the coating to the substrates. As a remedy to the foregoing problem, carbon black has been conventionally used to absorb infrared energy, thus offsetting the inherent reflective properties of the silver metal during firing. Additionally, lower melting glass frit compositions, having melt points below about 1100° F., were substituted for higher melting glass frits to improve the sintering and adhesion properties of the coating. However, because carbon black has a limited absorption range (it decomposes at 1094° F.), coatings exposed to firing temperatures above 1100° F. do not benefit from the use of carbon black, thus subjecting the substrate to greater thermal stresses between the substrate and the overlaying silver coating. Such conventional coatings were typically limited to a firing range of about 950° F. to about 1100° F. Induced stress is also exaggerated by the shorter cycle time and higher thermal temperatures used during the "firing" process. Hence, there is room for improvement in the art.

SUMMARY OF THE INVENTION

Based on the foregoing, the current art lacks a conductive silver coating that can adequately fuse while minimizing the thermal differences between the silver coating and the substrates of interest (glass, silicon, ceramic, or ceramic enamel) during short firing cycles and firing cycles requiring increased firing temperatures, i.e., above about 1100° F. The invention permits conductive coatings to be made with a wider range of frits, including those based on the borosilicates of lead, zinc, bismuth, and combinations thereof, and hence allows a wider firing range. The silver coatings of the invention allow firing over wide temperature ranges while ensuring good adhesion to the substrates, without subjecting the assembly to increased thermal stresses. The fusion temperature range of the glass frit and melting temperatures of inorganic pigments and compounds set the upper limit of the firing temperatures needed to adequately fuse the silver metal and other inorganic materials together, and subsequently to the substrate, without inducing further thermal stress.

Thermal stress is defined herein as the mechanical stress caused by the temperature difference over a small area. In particular, as the substrate and conductive silver coating are heated, those portions of the substrate bearing a conventional silver coating will have a lower temperature than portions of the substrate not bearing such a coating. The temperature difference creates thermal stress. The compositions of the invention allow relatively consistent infrared absorption over an extended firing temperature range, thus more closely matching the thermal absorption of the coating to the thermal absorption rate of the substrate, such as a high-IR absorbing black ceramic enamel, resulting in closer thermal equilibrium between the conductive silver coating and the substrate. Hence, thermal stress during the formation of such conductive coatings on substrates such as glass, enamel, ceramic, and ceramic-enamel is reduced.

The ultra low-emissivity conductive coatings of the invention permit firing temperatures of about 950° F. up to about 1400° F. Carbon black provides infrared absorption until its decomposition temperature of 1094° F., while the other ingredients in the coating maintain a similar or higher level of infrared absorption beyond 1094° F., up to about 1400° F. This permits increased firing temperatures, and hence speeds (i.e., decreases) firing cycle times, without inducing additional thermal stress.

A first embodiment of the invention is an infrared-absorbing composition, the dry portion of which comprises, prior to firing: about 65 to about 93 wt % of a silver component comprising silver powder having a tap density of about 0.4 to about 4.3 g/cc; about 0.1 to about 5 wt % of a borosilicate glass frit comprising an oxide of a metal selected from the group consisting of lead, zinc, bismuth, and combinations thereof; about 5 to about 10 wt % of a co-ground blend of a glass frit comprising an oxide of a metal selected from the group consisting of lead, zinc, bismuth and combinations thereof and a metal powder selected from the group consisting of selenium and bismuth, and combinations thereof; about 1 to about 10 wt % of carbon black; about 0.1 to about 5 wt % of inorganic black pigment; and about 0.1 to about 5 wt % of a staining compound comprising $Ag_3PO_4$, $MoO_3$, and $FeCr_2O_4$.

A second embodiment of the invention is a composition comprising, prior to firing: about 65 to about 93 wt % of a silver component comprising a silver powder having a tap density of about 0.4 to about 4.3 g/cc and a specific surface area of about 0.25 to about 1.5 m²/g; about 0.5 to about 5 wt % of a borosilicate glass frit comprising an oxide of a metal selected from the group consisting of lead, zinc, bismuth, and combinations thereof; about 5 to about 10 wt % of a co-ground blend, having a particle $D_{50}$ of less than about 5 microns, including a metal powder selected from the group consisting of selenium, bismuth, and combinations thereof and a glass frit selected from the group consisting of glass A, glass B and glass C, and combinations thereof:

| wt % | Glass A | Glass B | Glass C |
| --- | --- | --- | --- |
| PbO | 50-60 | | |
| $Bi_2O_3$ | | | 50-60 |
| $SiO_2$ | 20-30 | 20-30 | 20-30 |
| ZnO | 5-15 | 50-60 | 5-15 |

-continued

| wt % | Glass A | Glass B | Glass C |
|---|---|---|---|
| $B_2O_3$ | 5-15 | 5-15 | 5-15 |
| $TiO_2$ | 0.1-5 | 0.1-5 | 0.1-5 |
| $ZrO_2$ | 0.1-5 | 0.1-5 | 0.1-5 |
| $Al_2O_3$ | 0.1-5 | 0.1-5 | 0.1-5 |
| $Li_2O + Na_2O + K_2O$ | 2-10 | 2-10 | 2-10 |
| F | 0.1-2 | 0.1-2 | 0.1-2 | wherein the particle $D_{50}$ of said co-ground blend is less than about 5 microns; about 1 to about 10 wt % carbon black; about 0.1 to about 5 wt % of an inorganic black pigment; and about 0.1 to about 5 wt % of a staining compound, the staining compound comprising 30 to about 50 wt % $Ag_3PO_4$, 30 to about 50 wt % $MoO_3$; and 15 to about 25 wt % $FeCr_2O_4$, wherein the composition absorbs at least 65% of incident infrared radiation from about 700 nm to about 2500 nm.

A third embodiment of the invention is a method for producing an infrared-absorbing composition comprising: blending together to form a paste: about 44 to about 93 wt % of a silver component, wherein 100 wt % of the silver component comprises about 40 to about 70 wt % of a silver powder having a tap density of 0.40 to about 4.3 g/cc and specific surface area of 0.25 to about 1.5 $m^2/g$ and about 30 to about 60 wt % of a silver flake having a tap density of 3 to about 5.8 g/cc and specific surface area from about 0.3 to about 1.4 $m^2/g$; about 0.5 to about 5 wt % of a borosilicate glass frit comprising an oxide of a metal selected from the group consisting of lead, zinc, bismuth, and combinations thereof, about 5 to about 10 wt % of a co-ground blend having a particle $D_{50}$ of less than about 5 microns including a metal powder selected from the group consisting of selenium, bismuth, and combinations thereof; and a glass frit selected from the group consisting of glass A, glass B and glass C, and combinations thereof:

| wt % | Glass A | Glass B | Glass C |
|---|---|---|---|
| PbO | 50-60 | | |
| $Bi_2O_3$ | | | 50-60 |
| $SiO_2$ | 20-30 | 20-30 | 20-30 |
| ZnO | 5-15 | 50-60 | 5-15 |
| $B_2O_3$ | 5-15 | 5-15 | 5-15 |
| $TiO_2$ | 0.1-5 | 0.1-5 | 0.1-5 |
| $ZrO_2$ | 0.1-5 | 0.1-5 | 0.1-5 |
| $Al_2O_3$ | 0.1-5 | 0.1-5 | 0.1-5 |
| $Li_2O + Na_2O + K_2O$ | 2-10 | 2-10 | 2-10 |
| F | 0.1-2 | 0.1-2 | 0.1-2 | wherein the particle $D_{50}$ of said co-ground blend is less than about 5 microns; about 1 to about 10 wt % carbon black; about 0.1 to about 5 wt % of an inorganic black pigment; and about 0.1 to about 5 wt % of a staining compound, the staining compound comprising about 30 to about 50 wt % $Ag_3PO_4$, about 30 to about 50 wt % $MoO_3$; and about 15 to about 25 wt % $FeCr_2O_4$; about 1 to about 20 wt % of an organic medium, and about 0.5 to about 1 wt % of a surfactant; mixing together the foregoing using high shear dispersion to homogenize the paste; casting the paste; and firing the paste, wherein the composition absorbs radiation in at least a portion of the infrared spectrum.

The foregoing and other features of the invention are hereinafter more fully described and particularly pointed out in the claims, the following description setting forth in detail certain illustrative embodiments of the invention, these being indicative, however, of a few of the various ways in which the principles of the present invention may be employed.

BRIEF DESCRIPTION OF THE DRAWING(S)

DETAILED DESCRIPTION OF THE INVENTION

Figure 1:
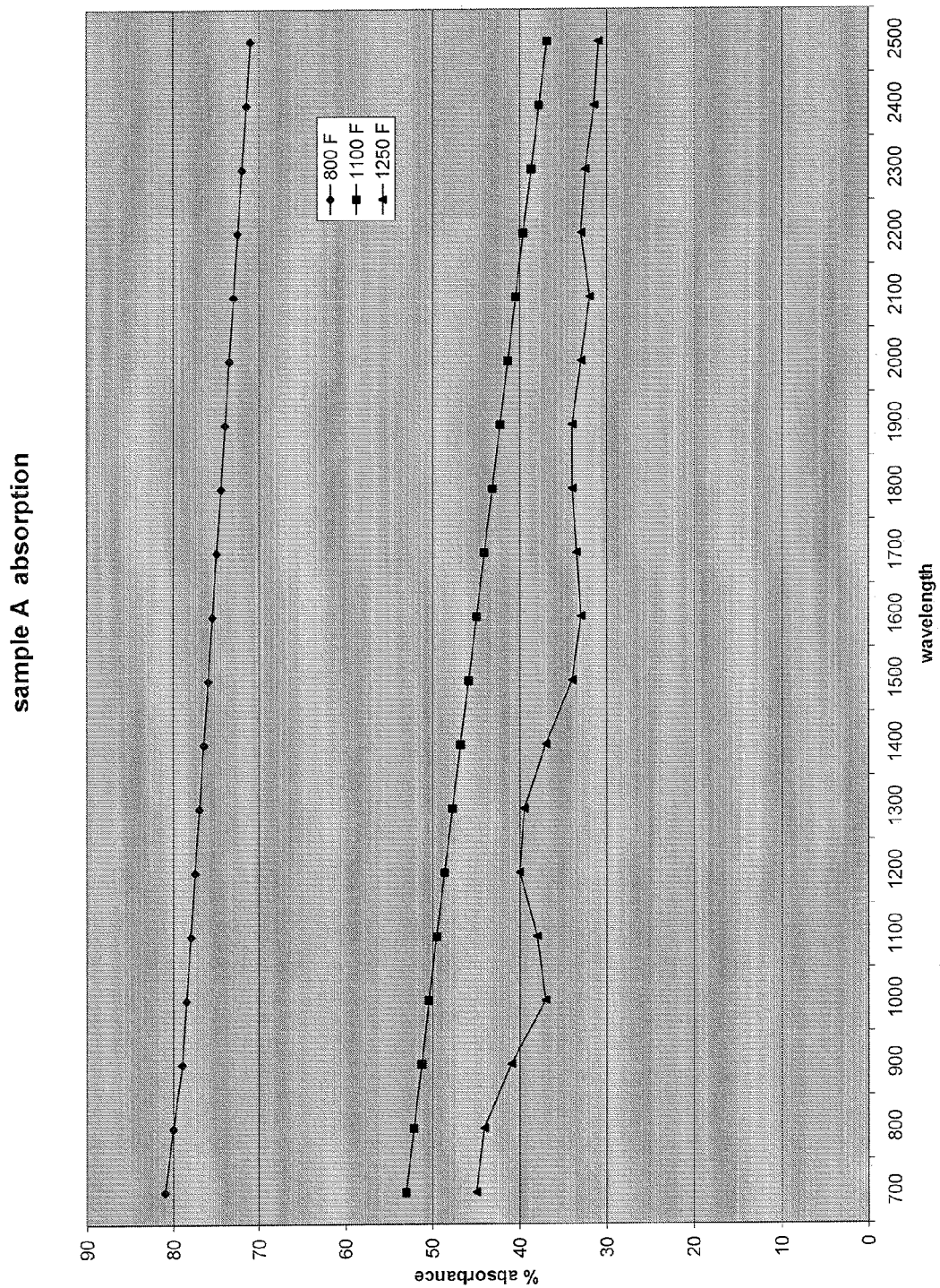
FIG. 1 is an infrared absorption spectrum of sample A from 700 to 2500 nm wavelength.

The present invention is an infrared reflective composition including silver metal in one or two forms: powder and/or flake. The composition further includes selenium and/or bismuth metal powder and borosilicate glass frit comprising at least one of lead, zinc and/or bismuth frit. The selenium and/or bismuth metal powder is co-ground with one or more of the aforementioned glass frit(s). An additional, separate, portion of glass frit(s) is included. Carbon black, one or more inorganic black pigments, and a staining compound comprising a mixture of silver phosphate/molybdic oxide/iron chromate are also included. A paste may be formed by blending the co-ground aforementioned frit(s) composition and selenium and/or bismuth metal powder mixture with one or two silver metal morphologies, carbon black, inorganic black pigments and the staining compound with one or more organic solvents and surfactants systems mentioned and dispersed, by way of mixing and/or high shear milling, to a desired viscosity.

In particular, a first embodiment of the invention is an infrared-absorbing composition, the dry portion of which comprises, prior to firing: about 65 to about 93 wt % of a silver component comprising silver powder having a tap density of about 0.40 to about 4.3 g/cc; about 0.1 to about 5 wt % of a borosilicate glass frit comprising an oxide of lead, zinc, bismuth, and combinations thereof, about 5 to about 10 wt % of a co-ground blend of a glass frit comprising an oxide of lead, zinc, bismuth and combinations thereof and a metal powder selected from the group consisting of selenium and bismuth, and combinations thereof, about 1 to about 10 wt % of carbon black; about 0.1 to about 5 wt % of inorganic black pigment; and about 0.1 to about 5 wt % of a staining compound comprising $Ag_3PO_4$, $MoO_3$, and $FeCr_2O_4$.

A second embodiment of the invention is a composition that absorbs at least 65% of incident infrared radiation from about 700 to about 2500 nm, comprising, prior to firing: about 65 to about 93 wt % of a silver component comprising a silver powder having a tap density of about 0.4 to about 4.3 g/cc and a specific surface area of about 0.25 to about 1.5 $m^2/g$; about 0.5 to about 5 wt % of a borosilicate glass frit comprising an oxide of lead, zinc, bismuth, and combinations thereof; about 5 to about 10 wt % of a co-ground blend of a metal powder selected from the group consisting of selenium, bismuth, and combinations thereof and a glass frit selected from the group consisting of glass A, glass B and glass C:

| wt % | Glass A | Glass B | Glass C |
|---|---|---|---|
| PbO | 50-60 | | |
| $Bi_2O_3$ | | | 50-60 |
| $SiO_2$ | 20-30 | 20-30 | 20-30 |

-continued

| wt % | Glass A | Glass B | Glass C |
|---|---|---|---|
| ZnO | 5-15 | 50-60 | 5-15 |
| $B_2O_3$ | 5-15 | 5-15 | 5-15 |
| $TiO_2$ | 0.1-5 | 0.1-5 | 0.1-5 |
| $ZrO_2$ | 0.1-5 | 0.1-5 | 0.1-5 |
| $Al_2O_3$ | 0.1-5 | 0.1-5 | 0.1-5 |
| $Li_2O + Na_2O + K_2O$ | 2-10 | 2-10 | 2-10 |
| F | 0.1-2 | 0.1-2 | 0.1-2 | wherein the particle $D_{50}$ of said co-ground blend is less than about 5 microns; about 1 to about 10 wt % carbon black; about 0.1 to about 5 wt % of an inorganic black pigment; and about 0.1 to about 5 wt % of a staining compound, the staining compound comprising 30 to about 50 wt % $Ag_3PO_4$, 30 to about 50 wt % $MoO_3$; and 15 to about 25 wt % $FeCr_2O_4$.

A third embodiment of the invention is a method for producing an infrared-absorbing composition comprising: blending together to form a paste: about 44 to about 93 wt % of a silver component, wherein 100 wt % of the silver component comprises about 40 to about 70 wt % of a silver powder having a tap density of 0.40 to about 4.3 g/cc and specific surface area of 0.25 to about 1.5 m²/g and about 30 to about 60 wt % of a silver flake having a tap density of 3 to about 5.8 g/cc and specific surface area from about 0.3 to about 1.4 m²/g; about 0.5 to about 5 wt % of a borosilicate glass frit comprising an oxide of a metal selected from the group consisting of lead, zinc, bismuth, and combinations thereof; about 5 to about 10 wt % of a co-ground blend of a metal powder selected from the group consisting of selenium, bismuth, and combinations thereof; and a glass frit selected from the group consisting of glass A, glass B and glass C:

| wt % | Glass A | Glass B | Glass C |
|---|---|---|---|
| PbO | 50-60 | | |
| $Bi_2O_3$ | | | 50-60 |
| $SiO_2$ | 20-30 | 20-30 | 20-30 |
| ZnO | 5-15 | 50-60 | 5-15 |
| $B_2O_3$ | 5-15 | 5-15 | 5-15 |
| $TiO_2$ | 0.1-5 | 0.1-5 | 0.1-5 |
| $ZrO_2$ | 0.1-5 | 0.1-5 | 0.1-5 |
| $Al_2O_3$ | 0.1-5 | 0.1-5 | 0.1-5 |
| $Li_2O + Na_2O + K_2O$ | 2-10 | 2-10 | 2-10 |
| F | 0.1-2 | 0.1-2 | 0.1-2 | wherein the particle $D_{50}$ of said co-ground blend is less than about 5 microns; about 1 to about 10 wt % carbon black; about 0.1 to about 5 wt % of an inorganic black pigment; and about 0.1 to about 5 wt % of a staining compound, the staining compound comprising about 30 to about 50 wt % $Ag_3PO_4$, about 30 to about 50 wt % $MoO_3$; and 15 to about 25 wt % $FeCr_2O_4$; about 1 to about 20 wt % of an organic medium, and about 0.5 to about 1 wt % of a surfactant; mixing together the foregoing using high shear dispersion to homogenize the paste; casting the paste; and firing the paste, wherein the composition absorbs radiation in at least a portion of the infrared spectrum.

The Ultra Low Emissivity formulations, when dispersed in an organic solvent and surfactant system, can be applied by various methods; including, but not limited to, ink-jet printing, screen printing, doctor blading, or spraying onto a glass, silicon, ceramic or ceramic glass enamel substrate such as automotive or architectural glass sheets, silicon based solar panels, glass panels for refrigerated units, and the like. In the construction industry, the composition could be applied to residential and commercial glass sheets for windows and doors. Applications in home appliances could include ceramic cook-top panels, and glass panels used in commercial refrigeration units, microwave ovens, conventional ovens, or any other functional or decorative panel used on a home appliance. The compositions can also be printed over ceramic glass enamel, which had previously been applied to the glass sheet or ceramic substrate. Prior to the high temperature firing, the applied coating can be dried by ambient air, infrared heating or conventional heating, or fired wet directly with no pre-drying. Improvements in both the process firing of silicon-based solar cells and other glass and ceramic substrates, as well as in the properties of the products produced, can thereby be realized. Each of the major constituents in the products and processes of the invention are detailed herein below.

A wide variety of Silver Powders and Silver Flakes are commercially available from Ferro Corporation, South Plainfield, N.J. and sold under product names. Products referenced in this invention are described as follows:

| Product Description | Ferro Products | Tap Density | Surface Area |
|---|---|---|---|
| Ag Powders | SPQ-ED, SFC20-ED | 2-4 g/cc | 0.5-1.5 m²/g |
| Ag Powders | SPG, SPC | 0.4-2 g/cc | 0.25-1.5 m²/g |
| Ag Flakes | SFW | 3-5.8 g/cc | 0.3-1.4 m²/g |

Ferro Corporation also sells other appropriate silver metal powders and silver metal flakes. Tap Density is a measure of the volume that a given weight of material will occupy after undergoing a certain amount of prescribed compaction as known in the art; reported as g/cc. Surface Area is determined by at least one of two techniques: permeametry by a Fisher Sub Sieve Sizer (FSSS); and gas absorption (Brunauer-Emmett-Teller method (BET)) by Quantachrome.

Silver Component. The invention includes a silver component, which may comprise silver powders and/or silver flakes, or a combination of the two. The compositions herein comprise about 44 to about 93 wt %, preferably about 65 to about 93 wt % of a silver component. Typically the silver component comprises at least one silver powder. Depending upon substrate and other processing differences, or where increases in solder adhesion and/or solder wet through resistance is required of the coating, silver metal flakes, having tap densities from about 3.0 to about 5.8 g/cc, can be proportionally substituted for the silver metal powders.

Silver Powder The inventive compositions and methods involve using one or more silver powder(s) having tap densities from about 0.40 to about 4.3 g/cc; and specific surface area from about 0.25 to about 1.5 m²/g. Separate portions of silver powders having densities of about 0.4 up to 2.0 g/cc and powders having tap densities of 2.0 to about 4.3 g/cc may be used.

Silver Flake The compositions herein may include silver flakes, typically having tap densities of about 3 to about 5.8 g/cc, and specific surface area of about 0.3 to about 1.4 m²/g. Such silver flakes can be proportionally substituted by weight for the silver metal powders at levels of about 5 to about 85 wt % of the silver component, preferably about 10 to about 75 wt %, more preferably about 20 to about 50 wt %, in situations where, differences in the substrate or other processing differences, or greater requirements for solder adhesion and/or solder wet through resistance are required of the coating. Alternatively, silver flakes herein may have a specific surface area of about 0.5 to about 1.25 m²/g.

The silver component can comprise up to 100 wt % silver powder having a tap density of about 0.40 to about 4.3 g/cc. In a preferred embodiment, the silver component comprises about 75 to about 99 wt % of silver powder having a tap density of more than 2 to about 4.3 g/cc, and about 1 to about 25 wt % of silver powder having a tap density of about 0.4 to 2 g/cc.

In another embodiment, the silver component comprises about 50 to about 85 wt % of silver powder having a tap density of about 0.4 to about 4.3 g/cc; and about 15 to about 50 wt % of silver flake having a tap density of about 3 to about 5.8 g/cc. In yet another embodiment, the silver component comprises: about 35 to about 65 wt % of silver powder having a tap density of more than 2 to about 4.3 g/cc; about 2 to about 15 wt % of silver powder having a tap density of about 0.4 to 2 g/cc; and about 5 to about 25 wt % of silver flake having a tap density of about 3 to about 5.8 g/cc.

In any embodiment, the silver powder may have a specific surface area of about 0.25 to about 1.5 $m^2/g$.

Glass Frit. The glass frits useful herein are not particularly limited. However, preferred frits include oxides of at least one of lead, zinc, and bismuth; combinations of the foregoing are also suitable. Further frit compositions may be found in Tables 1-3.

TABLE 1

Oxide frit ingredients for bismuth-based glasses in mole percent.

| | Glass Composition | | |
|---|---|---|---|
| Ingredient | I | II | III |
| $Bi_2O_3$ | 5-85 | 10-75 | 12-50 |
| $B_2O_3 + SiO_2$ | 5-75 | 15-75 | 34-71 |
| $Li_2O + Na_2O + K_2O$ | 0-40 | 5-30 | 10-30 |
| 20 trivalent oxides | 0-25 | 0-20 | 3-10 |
| ZnO | 0-55 | 0-20 | 0-12 |
| $Sb_2O_5 + Nb_2O_5$ | 0-40 | 0-30 | 0-20 |
| $TiO_2 + ZrO_2$ | 0-20 | 0-10 | 1-6 |

TABLE 2

Oxide frit ingredients for alkali-titanium-silicate glasses in mole percent.

| | Glass Composition | | |
|---|---|---|---|
| Ingredient | IV | V | VI |
| $Li_2O + Na_2O + K_2O$ | 5-55 | 15-50 | 30-40 |
| $TiO_2$ | 2-26 | 10-26 | 15-22 |
| $B_2O_3 + SiO_2$ | 5-75 | 25-70 | 30-52 |
| $V_2O_5 + Sb_2O_5 + P_2O_5$ | 0-30 | 0.25-25 | 5-25 |
| $MgO + CaO + BaO + SrO$ | 0-20 | 0-15 | 0-10 |
| F | 0-20 | 0-15 | 5-13 |

TABLE 3

Oxide frit ingredients for lead based glasses in mole percent.

| | Glass Composition | | |
|---|---|---|---|
| Ingredient | VII | VIII | IX |
| PbO | 15-75 | 25-66 | 50-65 |
| $B_2O_3 + SiO_2$ | 5-75 | 20-55 | 24-45 |
| ZnO | 0-55 | 0.1-35 | 0.1-25 |
| $Li_2O + Na_2O + K_2O$ | 0-40 | 0-30 | 0-10 |
| $TiO_2 + ZrO_2$ | 0-20 | 0-10 | 0.1-5 |
| 20 trivalent oxides | 0-25 | 0.1-20 | 1-10 |

The entry "20 trivalent oxides" means one or more trivalent oxides of an element selected from the group consisting of oxides of rare earth metals of the Lanthanum series (atomic numbers 57 to 71) plus Al, Ga, In, Sc, and Y.

In another embodiment, the glass component comprises: about 12 to about 50 mole % $Bi_2O_3$; about 25 to about 65 mole % $SiO_2$; about 5 to about 15 mole % $B_2O_3$; about 4 to about 26 mole % $K_2O$; $TiO_2$, wherein the content of $TiO_2$ does not exceed about 10 mole %; and an oxide of an element selected from the group Li, Na, K, Sb and combinations thereof, provided the combined total of such oxides does not exceed about 40 mol %, preferably at least about 1 mol % of the combination. In an embodiment containing alkali oxides the glass component comprises about 1 to about 15 mole % $Li_2O$, about 8 to about 25 mole % $Na_2O$, about 3 to about 25 mole % $K_2O$, about 8 to about 22 mole % $TiO_2$, about 25 to about 50 mole % $SiO_2$, about 2 to about 18 mole % $V_2O_5$, and about 0.25 to about 5 mole % $P_2O_5$, and may further comprise fluoride, not to exceed about 20 mol %.

In another embodiment, the composition may comprise one or more of the following, so long as the content of the following oxides does not exceed the indicated amount in mol % $Li_2O$ (15%), $Na_2O$ (25%), $K_2O$ (25%), $TiO_2$ (22%), $SiO_2$ (60%), $V_2O_5$ (18%), the sum of ($Sb_2O_5+V_2O_5+P_2O_5$) (25%), and F (15%).

Increasingly stringent environmental regulations often force manufacturers to find alternative products devoid of lead and cadmium. Hence, an embodiment of the invention includes a glass frit completely devoid of intentionally added lead and cadmium, in any form. However, when the properties of leaded glasses cannot be duplicated, an embodiment of the invention advantageously includes a glass frit comprising, prior to firing, lead oxide. A further embodiment of the invention is where the entire infrared-absorbing composition disclosed herein is completely devoid of intentionally added lead and cadmium in any form.

Other lead-containing embodiments include one or more of the following, so long as the content of the following oxides does not exceed the indicated amount in mol % PbO (65%), $SiO_2$ (30%), $B_2O_3$ (30%), ZnO (25%), and oxides of elements selected from the group consisting of Al, Ga, In, Sc, Y, La (25%), and ($TiO_2+ZrO_2$) (5%), provided that the total of ($B_2O_3+SiO_2$) does not exceed 45%. The lead-containing glass components may further comprise about 0.1 to about 8 mol % $Al_2O_3$.

In the presently most preferred embodiment, the glass frit comprises, prior to firing: 50-60 wt % $Bi_2O_3$; 20-30 wt % $SiO_2$; 5-15 wt % ZnO; 5-15 wt % $B_2O_3$; 0.1-5 wt % $TiO_2$; 0.1-5 wt % $ZrO_2$; 0.1-5 wt % $Al_2O_3$; 2-10 wt % $Li_2O+Na_2O+K_2O$; and 0.1-2 wt % F.

Selenium Metal and/or Bismuth Metal. Powdered selenium metal is used in the low-emissivity coating. However, bismuth metal powder is also useful. The metal powders have an average particle size ($D_{50}$) of about 0.5 to about 20 microns, preferably about 1 to about 15 microns, and more preferably about 3-12 microns. The particle size values are given for particles prior to any mixing, blending, grinding steps are undertaken. Selenium and bismuth metal powders are widely commercially available.

Co-Ground Blend. Details of the glass frits and metal powders are presented hereinabove. Surprisingly, the inventors have discovered a distinct advantage when at least a portion of the glass frit is co-ground (i.e., ground together) with metal powder (selenium and/or bismuth) prior to formulation of the overall dry composition (i.e., the paste without the organic medium, and surfactants). The co-ground blend of the lead, zinc and/or bismuth borosilicate glass frit and selenium/bismuth metal powders have a $D_{50}$ particle of less than 5 microns, preferably about 2 to less than about 5 microns, after co-grinding and prior to firing. The advantage of co-grinding is believed to be greater color uniformity, whereas a non-co-ground blend results in non-uniformity as seen with undispersed particles of the selenium and/or bismuth causing blotching and spotting of the coating after thermal firing. The co-ground blend is a mixture comprising a lead, zinc and/or bismuth borosilicate glass frit and selenium and/or bismuth metal powder, having a $D_{50}$ of about 0.5 to about 20 microns, the glass frit being selected from the group consisting of glass A, glass B and glass C:

| wt % | Glass A | Glass B | Glass C |
|---|---|---|---|
| PbO | 50-60 | | |
| $Bi_2O_3$ | | | 50-60 |
| $SiO_2$ | 20-30 | 20-30 | 20-30 |
| ZnO | 5-15 | 50-60 | 5-15 |
| $B_2O_3$ | 5-15 | 5-15 | 5-15 |
| $TiO_2$ | 0.1-5 | 0.1-5 | 0.1-5 |
| $ZrO_2$ | 0.1-5 | 0.1-5 | 0.1-5 |
| $Al_2O_3$ | 0.1-5 | 0.1-5 | 0.1-5 |
| $Li_2O + Na_2O + K_2O$ | 2-10 | 2-10 | 2-10 |
| F | 0.1-2 | 0.1-2 | 0.1-2 | wherein the particle $D_{50}$ of said co-ground blend (after grinding) is less than about 5 microns. In a preferred embodiment, the co-grind blend is comprised of 20 wt % to about 40 wt % of a borosilicate glass frit comprising an oxide selected from the group consisting of lead, zinc, and bismuth, and 20 wt % to about 40 wt % of selenium and/or bismuth metal powder. The dry blend is added to a ceramic ball mill along with the addition of 35 wt % to about 55 wt % of water. Grinding time is typically about 6 to about 14 hours, preferably about 8 to about 12 hours, more preferably about 9 to about 11 hours, in order to reach an average particle size of about 3 to about 4 microns, measured using a Horiba particle size analyzer or similar equipment. After grinding, the slurry is passed through a 325 mesh screen to remove any over-sized particles and/or agglomerates, onto trays for drying at 650° F. until the water content is below 0.1 wt %. Dry powder is then pulverized and passed through a 0.020-inch mesh stainless steel screen.

In an alternate embodiment of the invention, the co-ground blend further comprises a metal selected from the group consisting of Ni, Cu, Co, Te, Al, Ru, Sn, an oxide of a metal selected from the group consisting of metals having atomic numbers of 23 to 29, 49 to 51, FeO, and combinations thereof, wherein the total co-ground blend of such metals and oxides constitutes no greater than 10 wt % of the dry portion. However, the addition of the aforementioned metals and oxides is not critical to the practice of the invention.

Carbon black. The compositions herein include carbon black for its ability to absorb infrared (and other) energy absorption. In particular, compositions of the invention include about 0.5 to about 10 wt % of carbon black, preferably about 1 to about 8 wt %, more preferably about 2 to about 6 wt % and most preferably about 4 to about 5 wt %. Carbon black having a $D_{50}$ particle size of about 30 to about 80 nm, preferably about 40 to about 70 nm, more preferably about 50 to about 60 nm are useful herein. The specific surface is typically about 25 to about 85 $m^2/g$, preferably about 30 to about 80 $m^2/g$, more preferably about 40 to about 70 $m^2/g$. Carbon black absorbs infrared energy up to a firing temperature of 1094° C., when it decomposes into carbon monoxide and carbon dioxide.

An intensely black powder, carbon black is an amorphous form of carbon, produced by subjecting heavy residual oil (hydrocarbon) feedstock to extremely high temperatures in a carefully controlled combustion process (thermal or oxidative decomposition). Myriad commercial grades of varying size and structure are known, each produced through minute adjustments in different reactors. Carbon blacks provide pigmentation, conductivity and UV protection for a number of coating applications including marine, aerospace and industrial.

Inorganic Black Pigment. The compositions of the invention further include one or more inorganic black pigments (separately from carbon black, noted above). Suitable pigments herein include $CuCr_2O_4$ and $(Co,Fe)(Fe,Cr)_2O_4$ and the like. Examples include pigments available from Ferro Glass and Color Corporation, Washington Pa., such as 2991 pigment (copper chromite black), 2980 pigment (cobalt chromium iron black), 2987 pigment (nickel manganese iron chromium black), and O-1776 pigment (copper chromate black). In the presently most preferred embodiment of the invention, the inorganic black pigment is copper chromite spinel, available from Ferro Corporation as V-7702 or V-7709.

Staining Compound. The compositions of the invention comprise about 0.05 to about 10 wt % of a staining compound, preferably about 0.1 to about 5 wt %, and more preferably about 1 to 3 wt %. Broadly, the staining compound may include one or more of Rh, $Ag_3PO_4$, $MoO_3$, $FeCr_2O_4$, $CuCr_2O_4$, $MnCr_2O_4$, $V_2O_5$, $Pr_3O_3$, and CoO. In a prefer staining compound herein includes $Ag_3PO_4$, $MoO_3$, and $FeCr_2O_4$. In a more preferred embodiment, the staining compound includes about 30-50 wt % $Ag_3PO_4$, about 30-50% wt % $MoO_3$, and about 15 to about 25 wt % $FeCr_2O_4$. Typically the $D_{50}$ particle size of the constituent oxides is less than about 74 microns, preferably less than about 60 microns, and more preferably less than about 50 microns.

Paste. The dry ingredients (silver powders and/or flakes; glass frit; co-ground blend of glass frit and metal; carbon black; inorganic pigment; staining compound) are blended with an organic medium to form a paste. Additionally, surfactants and/or flow aids may be used. A paste herein may comprise a mixture of about 50 to about 90 wt % of any of the dry infrared-absorbing compositions disclosed herein; about 9 to about 49.5 wt % of an organic medium, and about 0.5 to about 1 wt % of a surfactant. The mixture is dispersed, for example, by manual or preferably mechanical blending or mixing, followed by additional dispersion and breakdown of agglomerates through a high shear process (such as, for example, a three-roll mill) to obtain a desired paste viscosity suitable for application onto the substrate of interest. This dispersed mixture can then be applied, by the user, onto a glass, silicon, ceramic or ceramic glass enamel substrate and fired to sinter the metals and densify the glass frits to the substrate.

Organic Medium. The organic medium comprises a binder and a solvent, which are selected based on the intended application. It is essential that the medium adequately suspend the particulates (i.e., metal powders, frit, pigment, etc) and burn off completely upon firing. Broadly, the organic medium may include petroleum/pine oil based solvents, ester alcohol based solvents, tridecyl alcohol based solvents, thermoplastic wax based binders, water miscible glycol based solvents. Simple aqueous solvents also may be used.

In particular, binders including methyl cellulose, ethyl cellulose, and hydroxypropyl cellulose, and combinations thereof, may be used. Suitable solvents include glycols such as ethylene glycol, propylene glycol and hexylene glycol; higher boiling alcohols such as Dowanol® (diethylene glycol monoethyl ether); butyl Carbitol® (diethylene glycol monobutyl ether); dibutyl Carbitol® (diethylene glycol dibutyl ether); butyl Carbitol® acetate (diethylene glycol monobutyl ether acetate); Texanol® (2,2,4-trimethyl-1,3-pentanediol monoisobutyrate), as well as other alcohol esters, kerosene, and dibutyl phthalate, diethylene glycol butyl ether; alpha-terpineol; beta-terpineol; gamma terpineol; tridecyl alcohol; diethylene glycol ethyl ether (Carbitol™), diethylene glycol butyl ether (Butyl Carbitol™); pine oils, vegetable oils, mineral oils, low molecular weight petroleum fractions, tridecyl alcohols, and synthetic or natural resins and blends thereof. Products sold under the Texanol® trademark are available from Eastman Chemical Company, Kingsport, Tenn.; those sold under the Dowanol® and Carbitol® trademarks are available from Dow Chemical Co., Midland, Mich. Surfactants and/or other film forming modifiers can also be included.

Dispersing Surfactant. A dispersing surfactant assists in pigment wetting, when an insoluble particulate inorganic pigment is used. A dispersing surfactant typically contains a block copolymer with pigment affinic groups. For example, surfactants sold under the Disperbyk® and Byk® trademarks by Byk Chemie of Wesel, Germany, such as Disperbyk 110, 140, and 163, which are solutions of high molecular weight block copolymers with pigment affinic groups, and a blend of solvents. Disperbyk 110 is a 1:1 blend of methoxypropylacetate and alkylbenzenes. Disperbyk 140 is a solution of alkylammonium salt of an acidic polymer in a methoxypropylacetate solvent. Disperbyk 163 has the solvents xylene, butylacetate and methoxypropylacetate in a 4/2/5 ratio.

Rheological Modifier. A Theological modifier is used to adjust the viscosity of the green pigment package composition. A variety of Theological modifiers may be used, including those sold under the Byk®, Disperplast®, and Viscobyk® trademarks, available from Byk Chemie. They include, for example, the BYK 400 series, such as BYK 411 and BYK 420, (modified urea solutions); the BYK W-900 series, (pigment wetting and dispersing additives); the Disperplast series, (pigment wetting and dispersing additives for plastisols and organosols); and the Viscobyk series, (viscosity depressants for plastisols and organosols).

The invention also includes an automotive glass, a solar cell, and a home appliance including a coating comprising any paste disclosed elsewhere herein.

While not being bound by theory, it is believed that the ultra low-emissivity coatings of the invention reduce the temperature differential between the coating itself and the substrate to which it is being applied during the firing process. Such a reduction in the temperature differential, during firing, may have either or both of the following effects: to improve the development of a ceramic enamel undercoat beneath the ultra low-emissivity coating (prevalent in automotive glass application) and/or to reduce the stresses on the glass, silicon, ceramic or ceramic glass enamel substrate caused by having a sharp temperature gradient between the coating and the aforementioned substrates.

EXAMPLES

The following examples are provided to illustrate preferred aspects of the invention and are not intended to limit the scope of the invention.

The ingredients in Table 4 are combined as follows. The co-grind additive (frit and selenium metal) and the staining compound were added to a ball mill and ground for about 10 hours. The particles were ground down to about 3-4 microns. The particles are screened through a 325 mesh screen (3.6 microns). The particles are dried at 650° F. and hammer milled until they pass through a 0.020 screen.

The staining compound ingredients are ball milled with water for one hour, dried and screened through a 200 mesh screen.

A separate portion of a lead, zinc and/or bismuth frit is ground to a $D_{50}$ particle size of 2.5-4.5 microns.

Carbon black, having an ash content of 0.3 wt %, a density of 450 grams/liter and average particle size 56 nanometers, was used. The carbon black was added to organic medium C7, the C7 being commercially available from Ferro Glass and Color Corporation, in a mixing bowl and mixed for 10 minutes. The glass frit, co-ground blend, inorganic black pigment and staining compound (disclosed elsewhere herein comprising $Ag_3PO_4$, $MoO_3$, and $FeCr_2O_4$) are added and mixed another 10 minutes. The glass frit is part number RD-2139, commercially available from Ferro Glass and Color Corporation. Silver powder and flake, with the indicated tap densities (TD), are added, and mixed for 5 minutes. The entire mixture is subjected to a high shear dispersion process on a three-roll mill at least two times, and the viscosity is adjusted with solvent, and the paste thus formed is ready for use, i.e., application to a substrate.

Applying the viscosity adjusted paste mixture to a substrate can be normally achieved by the following methods, i.e. screen printing, spraying, ink-jet printing, or other application methods whereby a uniform coating having a controlled thickness can be deposited onto the glass, silicon, ceramic or glass-ceramic substrate. Screen printing is the most common and presently preferred method of applying the pastes. The application method and parameters include the following:

A quantity of the paste mixture is applied onto a screen, either a mono-filament polyester fabric or stainless steel fabric, having a mesh size of 110 to 360 openings per inch, preferably 140 to 300 openings per inch. The "screen" refers to a fabric attached to a metal frame, glued and tightened to a desirable tension which will allow consistent flex and recovery of the screen fabric after each print stroke. Where thermoplastic wax based binders are used as the organic medium base, the use of a stainless steel fabric and subsequent insulator apparatus is used to electrically heat the fabric to a temperature of about 130° F. to about 170° F., which is needed to melt the paste to a screen-printable viscosity. In other cases where the paste mixture is using a organic medium, normal room temperature is sufficient to transfer the paste through the screen onto the substrate.

The method of transferring the paste mixture through the screen mesh is done using a hard rubber squeegee (preferably with a hardness of between 60-75 durometer, which is attached to a fixed metal holder, and mechanically or manually drawn across the screen during the printing cycle. The amount of paste that is passed through the screen and deposited onto the substrate (typically less than 50 microns) is primarily influenced by the mesh size (openings per inch), viscosity of the paste mixture, and amount of pressure applied by the squeegee against the screen fabric during the printing cycle.

Once the paste has been deposited onto the substrate, the paste can either enter the firing furnace wet or be pre-cured by first drying the paste. The drying process allows some portion of the solvents in the paste to be evaporated out so that handling of the material is possible without marring or otherwise disturbing the screen printed image.

After screen printing (and drying if desired), the substrate containing the deposited paste mixture is fired in a furnace at a temperatures of about 940° F. to about 1400° F. Normally, the firing parameters (firing temperature and soak time) are determined by the size, thickness, and composition of the substrate, as well as the desired mechanical and physical properties of the final substrate fired together with the low-E coating. Once the firing cycle is complete, the conductive silver coating is thermally fused to the substrate, at which point the coating provides the intended mechanical and physical properties.

During the firing process, the carbon black and all organic components of the silver paste mixture are burned away or consumed, leaving only the inorganic components, such as silver metal, glass frit, black pigment, staining compound, and any other inorganic material that might be formulated into the paste mixture.

Figure 2:
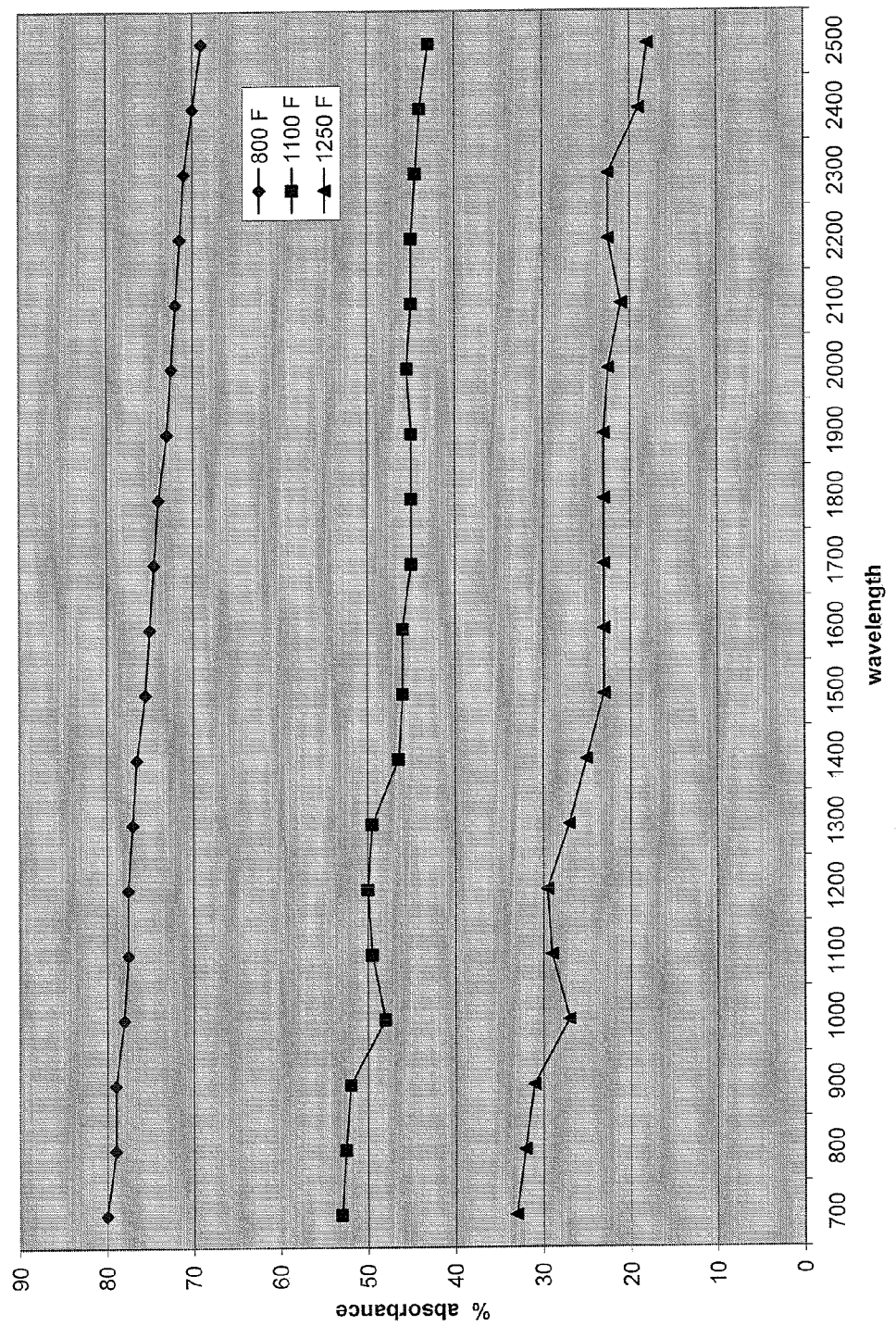
FIG. 2 is an infrared absorption spectrum of sample B from 700 to 2500 nm wavelength.
Figure 3:
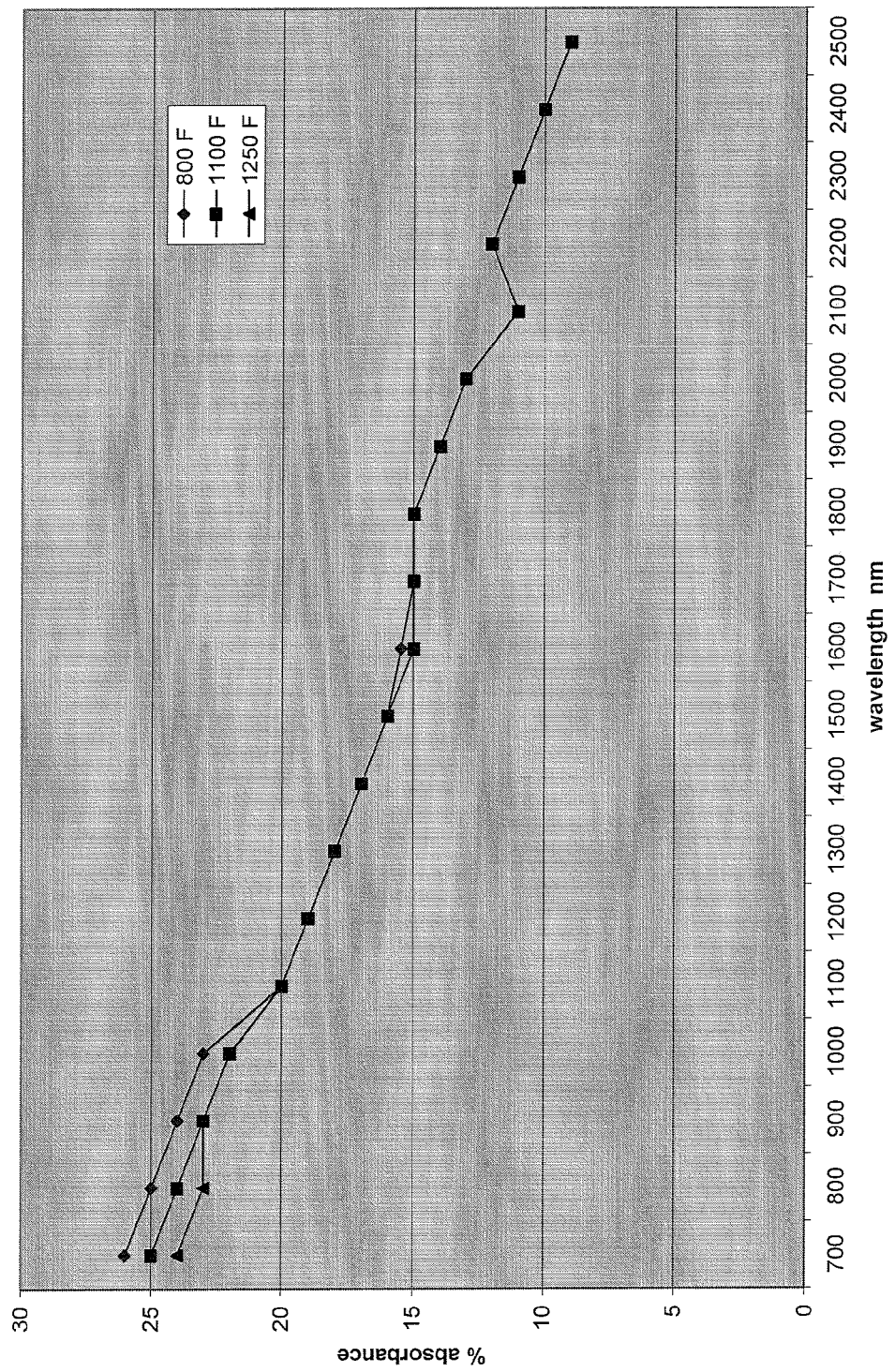
FIG. 3 is an infrared absorption spectrum of a prior art silver coating from 700 to 2500 nm wavelength.

Electrical and physical data of the coatings are given in Table 5. As can be seen from FIGS. 1 and 2, the absorbance of Samples A and B, are each far superior to the absorbance of the prior art silver coating (FIG. 3) at a given wavelength.

TABLE 4

Compositions of Samples A and B

| Ingredient (wt %) | Sample A | Sample B |
|---|---|---|
| Ag powder 2.4-3.1 g/cc | 50% | 50% |
| Ag powder 5.1 g/cc | 12% | 17% |
| Ag powder 1.2-2.3 g/cc | 9% | 8% |
| Se/glass frit (co-ground) | 10% | 9% |
| Glass frit | — | 0.5% |
| Carbon Black | 4.5% | 4% |
| V-7702 CuCr pigment | 1% | 0.5% |
| staining compound | 1.5% | 0.5% |
| organic vehicle | 12% | 10.5% |
| Disperbyk 110 | 5 drops | 5 drops |

TABLE 5

Electrical and Physical Data of Samples A and B, and prior art sample.

| Property | CCL-14005 (Prior art) | Sample A (invention) | Sample B (invention) |
|---|---|---|---|
| Resistance. (Based on screen printing through 200 mesh screen and fired at 1250° F./3 minutes.) | 1.21 ohms/foot | 1.76 ohms/foot | 1.30 ohms/foot |
| Avg. Solder Pull Data | | | |
| Fired at 1250° F./3 minutes | 46.2 lbs | 44.1 lbs | 41.9 lbs |
| Fired at 1300° F./3 minutes | 64.2 lbs | 64.2 lbs | 73.7 lbs |

The solder composition used to obtain solder pull data was 62% Pb, 25% Sn, 10% Bi, and 3% Ag. The coating was screen printed using a 200 mesh polyester fabric onto a ceramic glass enamel coating prior to firing.

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

The invention claimed is:

1. An infrared-absorbing composition, the dry portion of which comprises, prior to firing:
   a. About 65 to about 93 wt % of a silver component comprising silver powder having a tap density of about 0.4 to about 4.3 g/cc;
   b. about 0.1 to about 5 wt % of a borosilicate glass fit comprising an oxide of a metal selected from the group consisting of lead, zinc, bismuth, and combinations thereof;
   c. about 5 to about 10 wt % of a co-ground blend of
      i. a glass fit comprising an oxide of a metal selected from the group consisting of lead, zinc, bismuth and combinations thereof and
      ii. a metal powder selected from the group consisting of selenium and bismuth, and combinations thereof;
   d. about 1 to about 10 wt % of carbon black;
   e. about 0.1 to about 5 wt % of inorganic black pigment; and
   f. about 0.1 to about 5 wt % of a staining compound, the staining compound comprising:
      i. about 30 wt % to about 50 wt % of $Ag_3PO_4$;
      ii. about 30 wt % to about 50 wt % of $MoO_3$; and
      iii. about 15 wt % to about 25 wt % of $FeCr_2O_4$;
   wherein the staining compound particle $D_{50}$ is less than 74 microns.

2. The composition of claim 1, wherein the co-ground blend further comprises a metal selected from the group consisting of Ni, Cu, Co, Te, Al, Ru, Sn, an oxide of a metal selected from the group consisting of metals having atomic numbers of 23 to 29, 49 to 51, FeO, and combinations thereof, wherein the total co-ground blend of such metals and oxides constitutes no greater than 10 wt % of the dry portion.

3. The composition of claim 1, wherein 100 wt % of the silver component comprises:
   a. about 75 to about 99 wt % of silver powder having a tap density of more than 2 to about 4.3 g/cc, and
   b. about 1 to about 25 wt % of silver powder having a tap density of about 0.4 to 2 g/cc.

4. The composition of claim 1, wherein 100 wt % of the silver component comprises:
   a. about 50 to about 85 wt % of silver powder having a tap density of about 0.4 to about 4.3 g/cc; and
   b. about 15 to about 50 wt % of silver flake having a tap density of about 3 to about 5.8 g/cc.

5. The composition of claim 1, wherein 100 wt % of the silver component comprises:
   a. about 35 to about 65 wt % of silver powder having a tap density of more than 2 to about 4.3 g/cc;
   b. about 2 to about 15 wt % of silver powder having a tap density of about 0.4 to 2 g/cc; and
   c. about 5 to about 25 wt % of silver flake having a tap density of about 3 to about 5.8 g/cc.

6. The composition of claim 1, wherein the silver powder has a specific surface area of about 0.25 to about 1.5 $m^2$/g.

7. The composition of claim 1, wherein the co-ground blend has a particle $D_{50}$ of about 2 to about 5 microns.

8. The composition of claim 1, wherein the composition is free of intentionally added lead and cadmium, in any form.

9. A paste composition comprising:
   a. about 50 to about 90 wt % of the composition of claim 1;
   b. about 9 to about 49.5 wt % of an organic medium and
   c. about 0.5 to about 1 wt % of a surfactant.

10. A paste composition comprising:
    a. about 50 to about 90 wt % of the composition of claim 5;
    b. about 9 to about 49.5 wt % of an organic medium and
    c. about 0.5 to about 1 wt % of a surfactant.

11. A composition comprising, prior to firing:
    a. about 65 to about 93 wt % of a silver component comprising a silver powder having a tap density of about 0.4 to about 4.3 g/cc and a specific surface area of about 0.25 to about 1.5 $m^2$/g;
    b. about 0.5 to about 5 wt % of a borosilicate glass frit comprising an oxide of a metal selected from the group consisting of lead, zinc, bismuth, and combinations thereof;
    c. about 5 to about 10 wt % of a co-ground blend having a particle $D_{50}$ of less than about 5 microns, the co-ground blend comprising wherein,
       i. glass A comprises in wt %, 50-60% PbO, 20-30% $SiO_2$, 5-15% ZnO, 5-15% $B_2O_3$, 0.1-5% $TiO_2$, 0.1-5% $ZrO_2$, 0.1-5% $Al_2O_3$, 2-10% ($Li_2O+Na_2O+K_2O$), and 0.1-2% F;
       ii. glass B comprises in wt %, 20-30% $SiO_2$, 50-60% ZnO, 5-15% $B_2O_3$, 0.1-5% $TiO_2$, 0.1-5% $ZrO_2$, 0.1-5% $Al_2O_3$, 2-10% ($Li_2O+Na_2O+K_2O$), and 0.1-2% F; and
       iii. glass C comprises in wt %, 50-60% $Bi_2O_3$, 20-30% $SiO_2$, 5-15% ZnO, 5-15% $B_2O_3$, 0.1-5% $TiO_2$, 0.1-5% $ZrO_2$, 0.1-5% $Al_2O_3$, 2-10% ($Li_2O+Na_2O+K_2O$), and 0.1-2% F;
    d. about 1 to about 10 wt % carbon black;

e. about 0.1 to about 5 wt % of an inorganic black pigment; and f. about 0.1 to about 5 wt % of a staining compound, the staining compound comprising
   i. 30 to about 50 wt % $Ag_3PO_4$,
   ii. 30 to about 50 wt % $MoO_3$; and
   iii. 15 to about 25 wt % $FeCr_2O_4$, wherein the composition absorbs at least 65% of incident infrared radiation from about 700 to about 2500 nm.

12. A paste composition comprising:
   a. about 50 to about 90 wt % of the composition of claim 11;
   b. about 9 to about 49.5 wt % of an organic medium; and
   c. about 0.5 to about 1 wt % of a surfactant.

13. The composition of claim 11, wherein 100 wt % of the silver component comprises:
   a. about 50 to about 85 wt % of silver powder having a tap density of about 0.4 to about 4.3 g/cc and a specific surface area of about 0.25 to about 1.5 $m^2/g$; and
   b. about 15 to about 50 wt % of silver flake having a tap density of 3 to about 5.8 g/cc and a specific surface area from about 0.5 to about 1.25 $m^2/g$.

14. The composition of claim 11, wherein 100 wt % of the silver component comprises:
   a. about 75 to about 99 wt % of silver powder having a tap density of more than 2 to about 4.3 g/cc; and
   b. about 1 to about 25 wt % of silver powder having a tap density of about 0.4 to 2 g/cc.

15. An infrared-absorbing composition, the dry portion of which comprises, prior to firing:
   a. about 65 to about 93 wt % of a silver component comprising silver powder having a tap density of about 0.4 to about 4.3 g/cc;
   b. about 0.1 to about 5 wt % of a borosilicate glass frit selected from the group consisting of Glass A, Glass B, and combinations thereof;
      i. wherein Glass A comprises in wt %, 50-60% PbO, 20-30% $SiO_2$, 5-15% ZnO, 5-15% $B_2O_3$, 0.1-5% $TiO_2$, 0.1-5% $ZrO_2$, 0.1-5% $Al_2O_3$, 2-10% ($Li_2O+Na_2O+K_2O$) and 0.1-2% F, and
      ii. wherein Glass B comprises in wt %, 20-30% $SiO_2$, 50-60% ZnO, 5-15% $B_2O_3$, 0.1-5% $TiO_2$, 0.1-5% $ZrO_2$, 0.1-5% $Al_2O_3$, 2-10% ($Li_2O+Na_2O+K_2O$) and 0.1-2% F,
   c. about 5 to about 10 wt % of a co-ground blend of
      i. a glass frit selected from the group consisting of Glass A, Glass B and combinations thereof, and
      ii. a metal powder selected from the group consisting of selenium, bismuth, and combinations thereof;
   d. about 1 to about 10 wt % of carbon black;
   e. about 0.1 to about 5 wt % of inorganic black pigment; and
   f. about 0.1 to about 5 wt % of a staining compound, comprising:
      i. about 30 wt % to about 50 wt % of $Ag_3PO_4$;
      ii. about 30 wt % to about 50 wt % $MoO_3$; and
      iii. about 15 wt % to about 25 wt % $FeCr_2O_4$; wherein the staining compound particle $D_{50}$ is less than 74 microns.

16. The composition of claim 15, wherein the co-ground blend further comprises a metal selected from the group consisting of Ni, Cu, Co, Te, Al, Ru, Sn, an oxide of a metal selected from the group consisting of metals having atomic numbers of 23 to 29, 49 to 51, FeO, and combinations thereof, wherein the total co-ground blend of such metals and oxides constitutes no greater than 10 wt % of the dry portion.

17. The composition of claim 15 wherein the borosilicate glass frit of (b) is Glass A and wherein the glass frit contained in the co-ground blend of (c) is Glass A.

18. The composition of claim 15 wherein the borosilicate glass frit of (b) is Glass B and wherein the glass frit contained in the co-ground blend of (c) is Glass A.

19. The composition of claim 15 wherein the borosilicate glass frit of (b) is Glass A and wherein the glass frit contained in the co-ground blend of (c) is Glass B.

20. The composition of claim 15 wherein the borosilicate glass frit of (b) is Glass B and wherein the glass frit contained in the co-ground blend of (c) is Glass B.

* * * * *